(12) United States Patent
Bhattacharjee et al.

(10) Patent No.: US 11,189,432 B2
(45) Date of Patent: Nov. 30, 2021

(54) MICROFLUIDIC ELECTRICAL ENERGY HARVESTER

(71) Applicant: INDIAN INSTITUTE OF TECHNOLOGY, GUWAHATI, Guwahati (IN)

(72) Inventors: Mitradip Bhattacharjee, Guwahati (IN); Seim Timung, Guwahati (IN); Dipankar Bandyopadhyay, Guwahati (IN); Tapas Kumar Mandal, Guwahati (IN)

(73) Assignee: INDIAN INSTITUTE OF TECHNOLOGY, GUWAHATI, Guwahati (IN)

( * ) Notice: Subject to any disclaimer, the term of this patent is extended or adjusted under 35 U.S.C. 154(b) by 211 days.

(21) Appl. No.: 16/085,578

(22) PCT Filed: Aug. 29, 2017

(86) PCT No.: PCT/IN2017/050364
§ 371 (c)(1),
(2) Date: Sep. 16, 2018

(87) PCT Pub. No.: WO2018/078642
PCT Pub. Date: May 3, 2018

(65) Prior Publication Data
US 2020/0303132 A1    Sep. 24, 2020

(30) Foreign Application Priority Data
Oct. 24, 2016    (IN) .............................. 201631036408

(51) Int. Cl.
*H01L 31/00*    (2006.01)
*H01G 9/20*    (2006.01)

(52) U.S. Cl.
CPC ........... *H01G 9/2004* (2013.01); *H01G 9/209* (2013.01); *H01G 9/2027* (2013.01)

(58) Field of Classification Search
None
See application file for complete search history.

(56) References Cited

U.S. PATENT DOCUMENTS 2,402,662 A    6/1946    Ohl
2,524,035 A    10/1950    Bardeen et al.
(Continued)

FOREIGN PATENT DOCUMENTS

CN    101840948    9/2010
CN    201616445    10/2010
(Continued)

OTHER PUBLICATIONS

Nature 7, 303, Feb. 20, 1873.
(Continued)

*Primary Examiner* — Thanh Truc Trinh
(74) *Attorney, Agent, or Firm* — Pearl Cohen Zedek Latzer Baratz LLP

(57) ABSTRACT

Present invention discloses a microfluidic energy harvester for converting solar energy into electrical energy. A preferred embodiment of the present microfluidic energy harvester includes a substrate having an embedded central microchannel, electrolyte configured to reside and/or flow in said central microchannel and electrode assembly having one or more pair of electrodes arranged in a series and integrated with said central microchannel from sides ensuring direct contact between said pair for electrodes with said electrolyte while it reside and/or flow in said central microchannel for ensuing electrochemical photovoltaic effect to convert the solar energy into the electrical energy under direct solar illumination by working under regenerative (Continued)

conditions. The microfluidic energy harvester is capable of producing high density power from three different resources, (a) the solar irradiation produces a photovoltaic potential difference between the metal/metal-oxide electrodes, (b) SPR of the metal nanoparticles suspended in the electrolyte amplifies the photovoltaic potential difference under solar irradiation, and (c) the flow of the nanoparticle laden electrolyte produces a streaming potential between the electrodes by converting the mechanical energy into the electrical one near the electrodes. The transparency of the polymer and adequate absorptivity of the metal/metal-oxide electrodes ensured facile absorption of solar irradiation in the microfluidic energy harvester. The flexibility of the MEH can be tuned by adjusting the cross-linking of the PDMS matrix. The multiplicity of the microchannels and electrodes are expected to increase the total amount of energy harvested.

8 Claims, 6 Drawing Sheets

(56) References Cited

U.S. PATENT DOCUMENTS

| | | |
|---|---|---|
| 2,542,115 A | 2/1951 | Brown |
| 2,641,713 A | 6/1953 | Shive |
| 2,740,901 A | 4/1956 | Graham |
| 2,757,324 A | 7/1956 | Pearson |
| 2,780,765 A | 2/1957 | Chapin et al. |
| 2,794,863 A | 6/1957 | Van Roosbroeck |
| 2,873,303 A | 2/1959 | Rittner |
| 2,938,933 A | 5/1960 | Robinson et al. |
| 3,089,070 A | 5/1963 | Ralph |
| 3,370,986 A | 2/1968 | Amsterdam et al. |
| 3,376,163 A | 4/1968 | Abrahamsohn |
| 3,433,677 A | 3/1969 | Robinson |
| 3,984,256 A | 10/1976 | Fletcher et al. |
| 4,267,398 A | 5/1981 | Rothwarf |
| 4,385,102 A | 5/1983 | Fitzky et al. |
| 4,436,558 A | 3/1984 | Russak |
| 4,471,036 A | 9/1984 | Skotheim |
| 4,816,420 A | 3/1989 | Bozler et al. |
| 5,055,416 A | 10/1991 | Weber |
| 5,084,365 A | 1/1992 | Gratzel et al. |
| 5,279,678 A | 1/1994 | Jordan et al. |
| 5,646,050 A | 7/1997 | Li et al. |
| 6,028,265 A | 2/2000 | Ono et al. |
| 6,281,429 B1 | 8/2001 | Takada et al. |
| 6,335,480 B1 | 1/2002 | Bach et al. |
| 6,410,362 B1 | 6/2002 | Simburger et al. |
| 6,459,034 B2 | 10/2002 | Muramoto et al. |
| 6,787,692 B2 | 9/2004 | Wada et al. |
| 6,913,713 B2 | 7/2005 | Chittibabu et al. |
| 7,053,294 B2 | 5/2006 | Tuttle et al. |
| 7,687,977 B2 | 3/2010 | Xu |
| 7,737,356 B2 * | 6/2010 | Goldstein ............ H01G 9/2031 136/251 |
| 7,898,096 B1 | 3/2011 | Krupekin |
| 8,071,874 B2 | 12/2011 | Beckenbaugh et al. |
| 8,525,021 B2 | 9/2013 | Eaglesham |
| 8,664,514 B2 | 3/2014 | Watters |
| 8,981,214 B2 | 3/2015 | Ihn et al. |
| 9,013,092 B2 | 4/2015 | Mahapatra et al. |
| 9,299,866 B2 | 3/2016 | Yu et al. |
| 2003/0226498 A1 | 12/2003 | Alivisatos et al. |
| 2004/0025933 A1 | 2/2004 | Chittibabu et al. |
| 2004/0075363 A1 | 4/2004 | Malkin et al. |
| 2005/0224905 A1 | 10/2005 | Forrest et al. |
| 2007/0193621 A1 | 8/2007 | Brabec et al. |
| 2007/0240758 A1 | 10/2007 | Spartz |
| 2008/0023067 A1 | 1/2008 | Hu et al. |
| 2008/0078444 A1 | 4/2008 | Atanackovic |
| 2008/0083448 A1 | 4/2008 | Borden |
| 2008/0135083 A1 | 6/2008 | Lai et al. |
| 2008/0169017 A1 | 7/2008 | Korevaar et al. |
| 2008/0169019 A1 | 7/2008 | Korevaar et al. |
| 2008/0236657 A1 | 10/2008 | Brabec et al. |
| 2008/0264488 A1 | 10/2008 | Balasubramanian et al. |
| 2009/0038669 A1 | 2/2009 | Atanackovic |
| 2009/0229667 A1 | 9/2009 | Shrotriya et al. |
| 2009/0266418 A1 | 10/2009 | Hu et al. |
| 2009/0293950 A1 | 12/2009 | Chabrecek et al. |
| 2010/0051092 A1 * | 3/2010 | Dumitru ............... B82Y 30/00 136/255 |
| 2010/0089436 A1 | 4/2010 | Watters |
| 2010/0096001 A1 | 4/2010 | Sivananthan et al. |
| 2010/0126567 A1 | 5/2010 | Kaufman |
| 2011/0253982 A1 | 10/2011 | Wang et al. |
| 2011/0277813 A1 | 11/2011 | Rogers et al. |
| 2012/0067422 A1 | 3/2012 | Shao et al. |
| 2012/0097251 A1 * | 4/2012 | Takada ................ H01G 9/2031 136/263 |
| 2012/0181901 A1 | 7/2012 | Krupenkin et al. |
| 2014/0352784 A1 | 12/2014 | Kim et al. |
| 2015/0295516 A1 * | 10/2015 | Kwon ..................... H02N 1/08 310/300 |

FOREIGN PATENT DOCUMENTS

| | | |
|---|---|---|
| WO | WO 1996/008022 | 3/1996 |
| WO | WO 1997/015959 | 5/1997 |
| WO | WO 1997/035332 | 9/1997 |
| WO | WO 1998/005084 | 2/1998 |
| WO | WO 1999/063599 | 12/1999 |
| WO | WO 2007/149001 | 12/2007 |
| WO | WO 2011/139655 | 11/2011 |
| WO | WO 2013/171520 | 11/2013 |

OTHER PUBLICATIONS

C. E. Fritts, "On a new form of selenium cell, and some electrical discoveries made by its use"; American Journal of Science, Dec. 1883 Series 3 Vol. 26:465-472.

R. A. Millikan,"Effect of Residual Gases on Contact E.M.F's and Photo-Currents"; The American Physical Society (1914), Physical Review 4 (1), 73-75.

R. King et al., "40% efficient metamorphic GaInP/GaInAs/Ge multijunction solar cells"; (2007), Applied Physics Letters, 90, 183516.

T. Minami et. al., "High-Efficiency Oxide Solar Cells with ZnO/Cu2O Heterojunction Fabricated on Thermally Oxidized Cu2O Sheets"; Applied Physics Express, vol. 4, No. 6, May 23, 2011.

L. C. Olsen et. al. "Explanation for low-efficiency Cu2O Schottky-barrier solar cells"; Applied Physics Letters, vol. 34:1, Jan. 1, 1979, p. 47-49.

J. K. Moon et. al., "Electrical power generation by mechanically modulating electrical double layers", Nature Communication, 4:1487, pp. 1-6, Feb. 12, 2013.

T. Krupenkin et. al., "Reverse electrowetting as a new approach to high-power energy harvesting" (2011), Nature Communication, 2:448, Aug. 23, 2011.

J. A. Paradiso et. al., Energy Scavenging for Mobile and Wireless Electronics (2005), IEEE CS and IEEE Communications Society Pervasive computing, 5,1536-1268; pp. 18-27.

International Search Report of PCT Application No. PCT/IN2017/050364, dated Nov. 7, 2017.

* cited by examiner (A)

(B)

MICROFLUIDIC ELECTRICAL ENERGY HARVESTER

CROSS-REFERENCE TO RELATED APPLICATIONS

This application is a National Phase Application of PCT International Application No. PCT/IN2017/050364, International Filing Date Aug. 29, 2017, entitled "A MICROFLUIDIC ELECTRICAL ENERGY HARVESTER", published on May 3, 2018, under publication No. WO 2018/078642, which claims priority of Indian Patent Application No. 201631036408, filed on Oct. 24, 2016, all of which are hereby incorporated by reference in their entireties.

FIELD OF THE INVENTION

The present invention relates to conversion of solar energy into electrical energy. More specifically, the present invention is directed to develop an economic, environment friendly, and biodegradable microfluidic energy for producing electrical current/energy by combining influence of the solar irradiation, surface plasmon resonance (SPR), and streaming potential.

BACKGROUND ART

Tapping the diverse resources of renewable or non-renewable energies has been among the topmost priorities of the technological developments in the recent years owing to the explosive increase in energy demands of the modern society. In particular, the renewable energy sources are envisioned to develop a sustainable and energy efficient society. The economic, scalable, efficient, and eco-friendly renewable energy harvesters are tipped to replace most of the present generation energy harvesters. In particular, development of energy efficient and eco-friendly solar energy harvesters is among the topmost priorities owing to their natural abundance across the globe.

The journey of solar energy harvesters started with the invention of photovoltaic effect in 1839 [Ref: E. Becquerel (1839), Comptes Rendus, 9, 561-567] followed by the invention of the effects of light on the semiconducting materials such as selenium in 1873 [Ref: Nature 7, 303, 1873]. The first solid-state selenium based solar cell was the outcome of the pioneering work by Fritts [Ref: C. E. Fritts, (1883), American Journal of Science, 26, 465.], which was later revolutionized by the discovery of the photoelectric effect in early 1900 [Ref: A. Einstein, (1905), Annalen der Physik (ser. 4), 17, 132-148], where the interaction between the light and electrons were explained. Following this, many photo-sensitive devices were developed [Ref: R. A. Millikan, (1914), Physical Review 4 (1), 73-75, U.S. Pat. Nos. 2,402,662, 2,524,035, 2,542,115, 2,641,713, 2,740,901, 2,757,324] including the first experimental demonstration of the photoelectric effect [Ref: R. A. Millikan, (1914), Physical Review 4 (1), 73-75]. The first prototype of solar energy harvesters appeared much later in the 1950's with an efficiency ~4.5% [Ref: U.S. Pat. No. 2,780,765], which followed by a number of such devices with similar efficiencies [Ref: U.S. Pat. Nos. 2,794,863, 2,873,303]. The major challenges on the efficiencies in this era were partially resolved by Hoffman electronics showing a remarkable ~14% efficiency [Ref: U.S. Pat. No. 2,938,933]. Thereafter, different types of energy harvesting devices such as p-n junction, large-area, and electrochemical photovoltaic cells were developed [Ref: U.S. Pat. Nos. 3,089,070; 3,370,986; 3,433,677; 3,984,256; 4,385,102; 4,471,036; 4,436,558]. In 1985, the Center for Photovoltaic Engineering at the University of New South Wales unearthed the photovoltaic cells with ~20% efficiency. In 2006, the 40% efficiency barrier was broken through multi-junction solar energy harvesters [Ref: R. King et al., (2007), Applied Physics Letter, 90, 183516; US Patent Application US 2010/0096001 A1]. However, most of the aforementioned developments on the solar cells were in the inorganic front and off late, scientists and technologists started realizing that large scale manufacturing of silicon based photovoltaic cells has issues associated with economic feasibility, biodegradability, and environmental friendliness. Thus, over the years, developments of different generations of solar cell technologies have been observed.

The first generation is based on silicon and demonstrates efficiency about 15-20% [Ref: US Patent Application 2009/0038669 A1; US Patent Application 2011/0277813 A1; US Patent Application 2008/0078444 A1]. The silicon wafer based solar cells dominate the present day market due to their performance and stability although they suffer because of their lack of flexibility and large cost of production. The second generation photovoltaics are based on thin-films composed of materials such as, amorphous silicon, cadmium telluride or copper indium gallium diselenide, with typical efficiency ~10-15% [Ref: U.S. Pat. No. 5,646,050; US Patent Application 2008/0135083 A1] with a relatively lower cost of production. The third generation extensively uses smart materials, nanotechnology [Ref: US Patent application 2008/0169019 A1; US Patent Application 2008/0169017 A1] and polymers [Ref: US Patent Application 2009/0266418 A1; US Patent Application 2008/0023067 A1] such as the organic solar cells [Ref: US Patent Application 2005/0224905 A1; US Patent Application 2008/0264488 A1]. Polymer solar cells are inexpensive [Ref: US Patent Application 2009/0266418 A1; US Patent Application 2008/0023067 A1], flexible [Ref: U.S. Pat. No. 7,053,294 B2], and can be fabricated on roll-to-roll basis [Ref: US Patent Application 2011/0253982 A1; U.S. Pat. No. 6,410,362 B1] although face limitations associated with their stability and energy efficiency [Ref: US Patent Application 2003/0226498 A1]. This type of solar energy harvesters also covers multi-junction cells for improved performance although their commercial applicability is limited by high production cost [Ref: U.S. Pat. No. 6,787,692 B2; U.S. Pat. No. 6,459,034 B2]. Recently, the perovskite cells have recorded efficiencies beyond 20% [Ref: WO 2013/171520 A1] and are also under the process of commercialization [Ref: WO 2013/171520 A1].

In view of the above, in the recent years, extensive efforts have been invested to develop electrochemical, photo-electrochemical, dye-sensitized, and nano-enabled photovoltaic cells [Ref: U.S. Pat. Nos. 4,816,420; 5,055,416; 5,084,365; 5,279,678; WO 1996/008022 A1; WO 1997/035332 A1; WO 1997/015959 A1; WO 1998/005084 A1; WO 1999/063599 A1; U.S. Pat. Nos. 6,028,265; 6,281,429 B1; 6,335,480 B1; US Patent Application 2004/0025933 A1; U.S. Pat. No. 6,913,713 B2] composed of thin films, polymers, translucent materials and organic materials as a replacement of silicon based solar energy harvesters [Ref: US Patent Application 2007/0193621 A1; US Patent Application 2007/0240758 A1; US Patent Application 2008/0083448 A1; US Patent Application 2008/0236657 A1; US Patent Application 2009/0293950 A1; US Patent Application 2009/0229667 A1; US Patent Application US 2010/0089436 A1; CN 101840948 A; CN 201616445 U; U.S. Pat. No. 8,071,874 B2; US Patent Application 2012/0067422 A1; U.S. Pat.

No. 8,525,021 B2; U.S. Pat. No. 8,664,514 B2; U.S. Pat. No. 8,981,214 B2]. The focus is mainly on the use of smart and economic materials at the micro or nano-scale to bring in the specialties of nano-science and technology for lower cost of production, flexibility, portability, rapidness, bio-degradability, energy efficiency, environment friendliness, scalability, and stability.

Of particular interest here, is the Cu—$Cu_2O$ system for solar energy harvesting employing a microfluidic energy harvester (MEH). The metal oxide $Cu_2O$ is well known for its p-type semiconducting properties with a band gap of ~2 eV and relatively higher absorption coefficient in the visible region, which is suitable for solar energy harvesting [Ref: U.S. Pat. Nos. 3,376,163A; 4,267,398A]. In the past, verities of solar cells have been constructed using $Cu_2O$, for example, metal/p-$Cu_2O$, n-ZnO/p-$Cu_2O$, or n-CdO/p-$Cu_2O$. Among these devices, the previous Cu/$Cu_2O$ solar cells have shown maximum reported efficiency ~2% [Ref: T. Minami et. al., (2011), Applied Physics Express, 4, 062301]. The Cu—$Cu_2O$ systems also have advantages in lower production cost, non-toxic, relatively high minority carrier diffusion length, and the theoretical limit of efficiency of ~20% [Ref: L. C. Olsen et. al. (1979), Applied Physics Letter, 34, 1]. Interestingly, the $Cu_2O$ energy harvesters show higher efficiencies in the yellow to near UV region where the efficiency of the silicon energy harvesters is rather low.

In the recent past, a number of works have developed different kinds of MEH where the mechanical energy was converted to the electrical one for energy harvesting [Ref: U.S. Pat. No. 7,898,096 B1]. In particular, the flow inside microfluidic devices open up the possibility of the continuous conversion of mechanical energy into the electrical one, which are in general done by the hydel power generators at the macroscopic scale [Ref: U.S. Pat. No. 7,898,096 B1; US Patent Application 2012/0181901 A1]. The MEHs generating high power density from the variations in the zeta potential due to droplet actuation [Ref: J. K. Moon et. al., (2013), Nature Communication, 4, 1487], reverse electro-wetting [Ref: T. Krupenkin et. al., (2011), Nature Communication, 2, 448], or piezoelectric properties inside a microdevice [Ref: US2004/0075363 A1] have already been reported in the literature. The reported MEHs employ the specialties of nanoscience and nanotechnology to improve the efficiency of energy harvesting and power density [Ref: J. K. Moon et. al., (2013), Nature Communication, 4, 1487; T. Krupenkin et. al., (2011), Nature Communication, 2, 448]. For example, the specialties of nanowires [Ref: U.S. Pat. No. 9,299,866 B2], nanoparticles [Ref: US Patent Application 2014/0352784 A1], or nanotubes [Ref: U.S. Pat. No. 9,013,092 B2] of functional materials [Ref: U.S. Pat. No. 7,687,977 B2] have shown their importance in binding the solar irradiation through higher absorptivity [Ref: WO 2007/149001 A2] as well as enhancement of the electron-hole transport due to larger electrical conductivity [refer to, WO 2011/139655 A1]. Further, enhancement of efficiency and performance of the energy harvesters with the surface plasmon resonance (SPR) of the nanoscale objects such as wires, particles, or fibers have also been shown in the recent past [Ref: WO2015/038203 A1]. Importantly, MEHs are equally efficient in converting the different other forms of energies into electrical one [Ref: J. K. Moon et. al., (2013), Nature Communication, 4, 1487; T. Krupenkin et. al., (2011), Nature Communication, 2, 448] because the power density of many of the conventional macroscopic processes [Ref: J. A. Paradiso et. al., (2005), IEEE CS and IEEE Communications Society Pervasive computing, 5, 1536-1268] such as radio frequency (~1 $W/cm^2$), solar irradiation (~100 $mW/cm^2$), ambient illumination (~100 $W/cm^2$), thermoelectric (~60 $W/cm^2$) or vibration generators (~10-800 $W/cm^3$), or ambient air flow (~1 $mW/cm^2$) have been found to be comparable with the recently developed MEHs [refer to, J. K. Moon et. al., (2013), Nature Communication, 4, 1487]. A very large scale integration of the MEHs is envisioned to surpass the performance of the similar macroscopic devices and supply energy to diverse modern day gadgets such as mobile phones, tablets, laptops, or display units, in the near future.

OBJECT OF THE INVENTION

It is thus the basic object of the present invention is to develop a microchannel based microfluidic energy harvester which is portable, can be made flexible to rigid, economic, eco-friendly and capable of producing high density electrical energy to supply energy for a wide range of electronic applications like mobile phones, computers, biomedical or healthcare appliances, and fabrication/characterization instruments.

Another object of the present invention is to develop a microfluidic energy harvester adapted to be designed with commonly available materials and fabricated without employing any costly equipment for fabrication and integration.

Yet another object of the present innovation is to develop an electrolyte based microfluidic energy harvester which would be adapted to bind solar energy when illuminated under direct solar irradiation and generate electrical energy by using the solar energy.

Another object of the present innovation is to develop an electrolyte based microfluidic energy harvester which would be adapted to amplify electrical energy generation by combining influence of the solar irradiation with surface plasmon resonance (SPR), and streaming potential.

SUMMARY OF THE INVENTION

Thus according to basic aspect of the present invention there is provided a microfluidic energy harvester for converting solar energy into electrical energy comprising
  a substrate having an embedded central microchannel;
  electrolyte in said central microchannel;
  electrode assembly having at least one pair of electrodes arranged in a series and integrated with said central microchannel from sides ensuring direct contact between said pair for electrodes with said electrolyte in said central microchannel for ensuing electrochemical photovoltaic effect to convert the solar energy into the electrical energy under solar illumination and also under regenerative conditions.

According to another aspect in the present microfluidic energy harvester for converting solar energy into electrical energy, each of the pair of electrodes includes a conducting metal electrode and a semiconducting metal-oxide electrode having adequate bandgap to bind the solar energy under direct solar illumination.

According to yet another aspect in the present microfluidic energy harvester for converting solar energy into electrical energy, the substrate includes a transparent slab of polymer preferably poly-dimethylsiloxane embedding the central microchannel having an inlet and an outlet;
  said substrate includes plurality of tributary microchannels arranged in series and perpendicular to the central microchannel on both the sides, each of the tributary microchannels is connected to the central microchannel and includes provision for inserting the conducting metal and/or the semiconducting metal-oxide electrode enabling the electrodes to be in contact with the electrolyte residing and/or flowing in the central microchannel without touching each other.

According to another aspect in the present microfluidic energy harvester for converting solar energy into electrical energy, the semiconducting metal-oxide electrodes include $Cu_2O$ electrodes inserted in the tributary microchannels in one side of the main microchannel and the conducting metal electrodes include Cu electrodes inserted in the tributary microchannels in other side of the central microchannel ensuring the electrodes from both the sides do not touch each other and each of the electrodes touches the electrolyte residing and/or flowing in the central microchannel.

According to a further aspect in the present microfluidic energy harvester for converting solar energy into electrical energy, the electrolyte is configured to flow in the central microchannel through the inlet by using hydrostatic head or micro-pump at a constant flow rate enabling conversion of mechanical energy of the electrolyte flow into streaming potential across the electrodes and showing a potential difference equivalent to combined influences from the solar energy and the streaming potential resulting amplification of the electrical energy generation.

According to yet another aspect in the present microfluidic energy harvester for converting solar energy into electrical energy, the electrolyte includes a suspension of saltwater and metal nanoparticles capable of producing surface plasmon resonance (SPR) under direct solar illumination when it flow through the central microchannel which enhance potential difference across the electrodes and generates the potential difference equivalent to combined influences from the solar energy, the streaming potential and the surface plasmon resonance resulting further amplification of the electrical energy generation.

According to a further aspect in the present microfluidic energy harvester for converting solar energy into electrical energy, the electrolyte preferably includes suspension of aqueous 4.0M NaCl solution with 20% (v/v) metallic nanoparticle (AuNP) concentration.

According to another aspect in the present microfluidic energy harvester for converting solar energy into electrical energy, the electrochemical photovoltaic unit generated electrochemical photovoltaic potential is $$U_{ECPV} = \frac{nkT}{q}\ln\left(\frac{I_{Ph}}{I_D} + 1\right),$$

where n is ideality factor, k is Boltzmann constant, T is absolute temperature, q is charge of electron, $I_{ph}$ is current in presence of light and $I_D$ is the current in the dark.

According to yet another aspect in the present microfluidic energy harvester for converting solar energy into electrical energy, the streaming potential generated due to the electrolyte flow is $$U_{SP} = \frac{128\varepsilon_r\varepsilon_0\zeta LF_R}{\pi d^4 K_L},$$

where, d is effective diameter of the central microchannel, L is length of the central microchannel, $K_L$ is specific electrical conductivity of the electrolyte, $F_R$ is flow rate of the electrolyte, $\varepsilon_r$ is dielectric constant of water, $\varepsilon_0$ is dielectric permittivity of free space, and $\zeta$ is zeta-potential of the electrodes.

According to another aspect in the present microfluidic energy harvester for converting solar energy into electrical energy, the enhancement of potential due to the SPR is $U_{SPR}=n_{abs}U_{ECPV}$, where $n_{abs}$ is fraction of optical absorption increased due to the SPR.

According to another aspect in the present microfluidic energy harvester for converting solar energy into electrical energy, the conversion of the solar energy into the electrical energy due to the electrochemical photovoltaic effect under direct solar illumination by working under regenerative conditions includes generation of electron-hole pairs or excitons under direct solar illumination wherein electrons from valance band of the semiconductor electrodes jumped to conduction band, leaving a hole behind;

transferring of the electron to cations of redox couples present in the electrolyte;

simultaneous transferring of the hole to the metal electrode through external circuit and oxidizing anions of the redox couple in the electrolyte.

BRIEF DESCRIPTION OF THE ACCOMPANYING DRAWINGS

Figure 7:
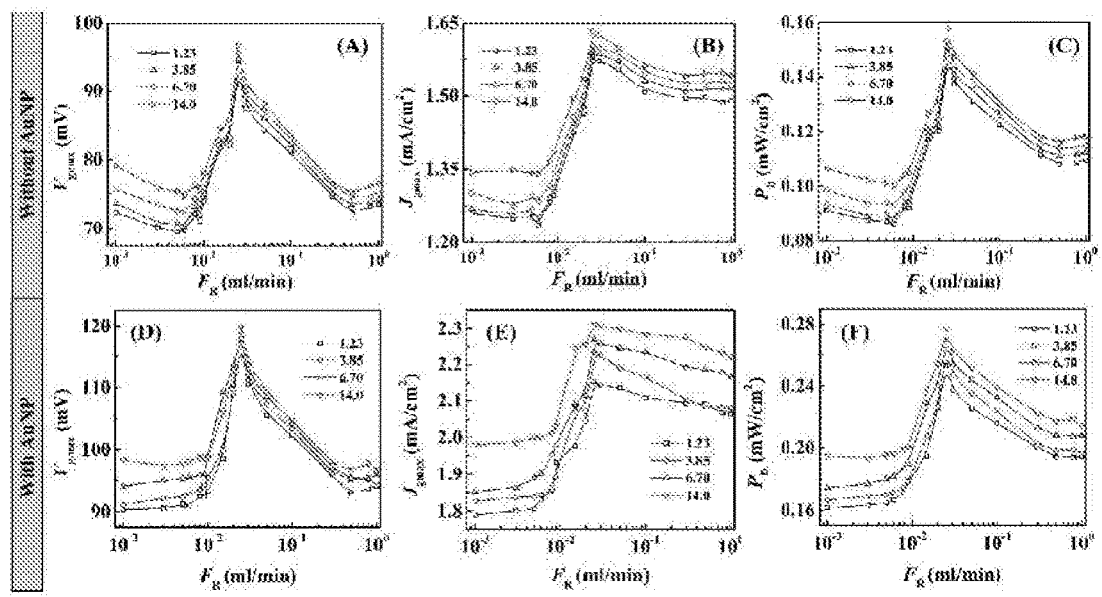

FIG. 7 show optimization of flow rate of the present microfluidic energy harvester for maximum output, with and without AuNPs: change in maximum generated voltage ($V_{gmax}$), current density ($J_{gmax}$), and power density ($P_D$) for 4M NaCl solution at different flow rates with 9 electrodes (A)-(C); change in maximum generated voltage ($V_{gmax}$), current density ($J_{gmax}$), and power density ($P_D$) for 4M NaCl solution with 20% of AuNPs concentration at different flow rates with 9-pair electrodes (D)-(F).

Figure 8:
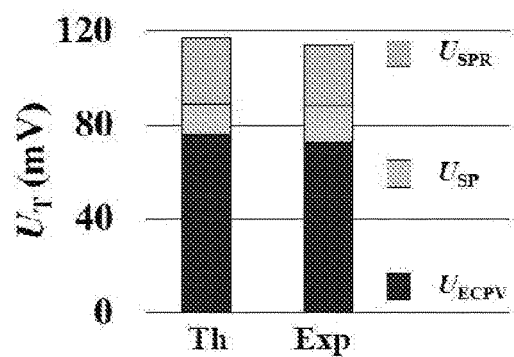
Figure 8:
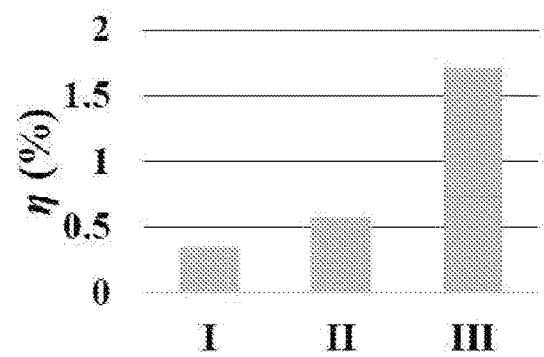

FIG. 8 show (A) comparison of theoretical and experimental output and (b) efficiency calculation for optimized flow-rate and AuNP concentration in accordance with the present microfluidic energy harvester.

Figure 9:
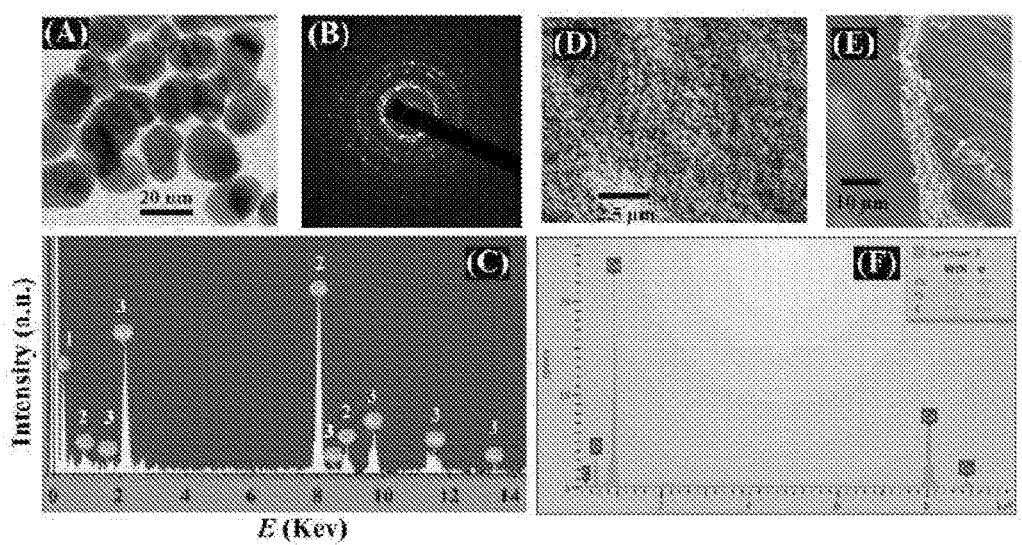

FIG. 9 (A)-(F) show characterizations of AuNPs and Cu—$Cu_2O$ electrodes in accordance with the present microfluidic energy harvester.

Figure 10:
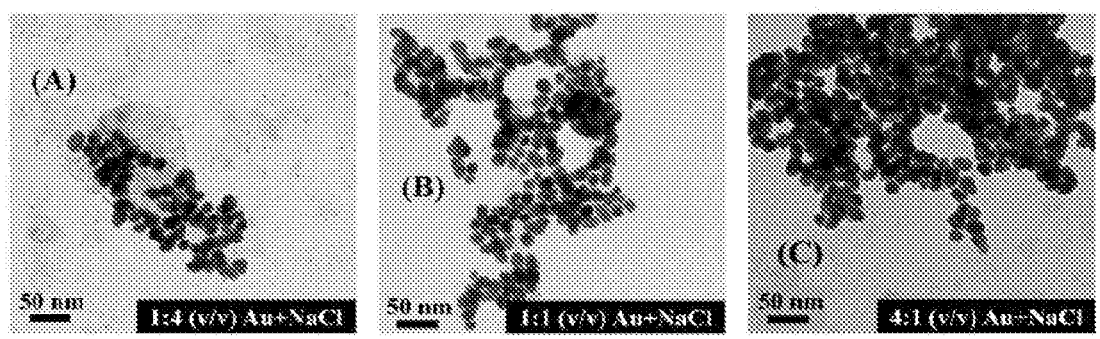

FIG. 10 show agglomeration of AuNPs at different concentration of AuNPs in 4M NaCl in accordance with the present microfluidic energy harvester.

DETAILED DESCRIPTION OF THE INVENTION WITH REFERENCE TO THE ACCOMPANYING DRAWINGS

As stated hereinbefore the present invention discloses a novel microfluidic energy harvester (MEH) which is configured to convert solar energy into electrical energy and amplify voltage generated from the solar energy by involving surface plasmon resonance (SPR) and/or streaming potential.

The microfluidic energy harvester of the present invention includes a polymer substrate in which a microchannel is embedded for the flow of electrolyte. The microchannel is integrated with an electrode assembly from the sides. The electrode assembly includes one or more pair of electrodes arranged in a series wherein each pair for electrodes includes a conducting metal and a semiconducting metal-oxide electrode. The metal/semiconducting metal-oxide electrodes combination is chosen in such a manner that they had just adequate bandgap to bind solar energy under direct solar illumination.

In a preferred embodiment, the electrolyte includes a suspension of salt-water and metal nanoparticles and configured reside and/or flow in the central microchannel with the help of hydrostatic head at a constant flow rate. The metal nanoparticles and their size and the shape are selected in such a manner that they are capable of producing SPR under direct solar illumination.

During flow of the electrolyte through the microchannel, the metal/semiconducting metal-oxide electrodes come in direct contact with the electrolyte suspended with nanoparticles. The contact of the electrolyte with the electrodes not only ensure easy flow of current because of the voltage generated by the solar energy and SPR but also the arrangement facilitates conversion of mechanical energy of the electrolyte flow into the streaming potential across the electrodes. Thus, under direct solar illumination, when the electrolyte suspended with metal nanoparticles is flown inside the microchannel of the present microfluidic energy harvester, the electrodes show a potential difference equivalent to the combined influences from the solar energy, SPR, and streaming potential.

Reference is first invited from the accompanying FIGS. 1(A)-(C) and 2 which show a preferred embodiment of the present microfluidic energy harvester and its different cross sectional views respectively. As shown in the referred figures, the polymer substrate 101 which preferably includes a central microchannel 103 embedded inside a transparent slab of poly-dimethylsiloxane. One ends of the central microchannel 103 is used as inlet and other end of the central microchannel 103 is used as outlet. A series of tributary microchannels 102 are also fabricated in perpendicular to the central microchannel 103 on both the sides. Each of the tributary microchannels 102 is connected to the central microchannel 103 and includes provision for inserting the metal and/or metal-oxide electrode.

Figure 1:
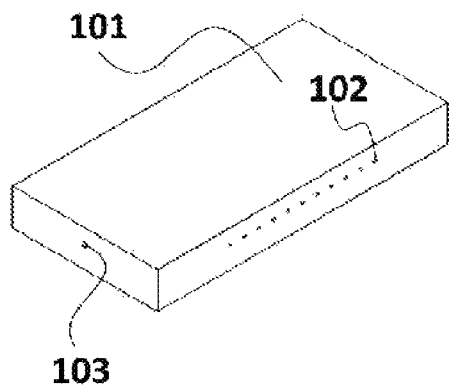
FIG. 1 show (A) isometric (B) side and (C) front views of a preferred embodiment of present microfluidic energy harvester.
Figure 1:
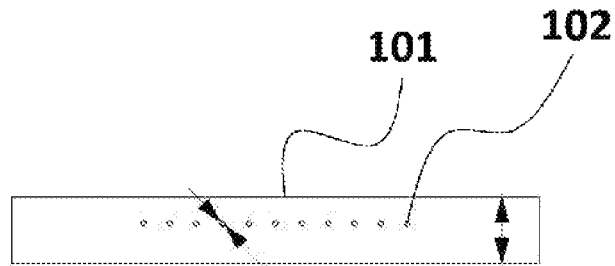
Figure 1:
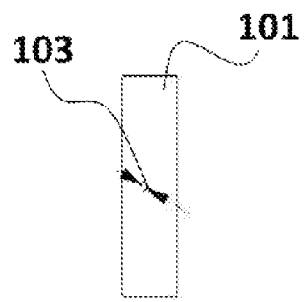
Figure 2:
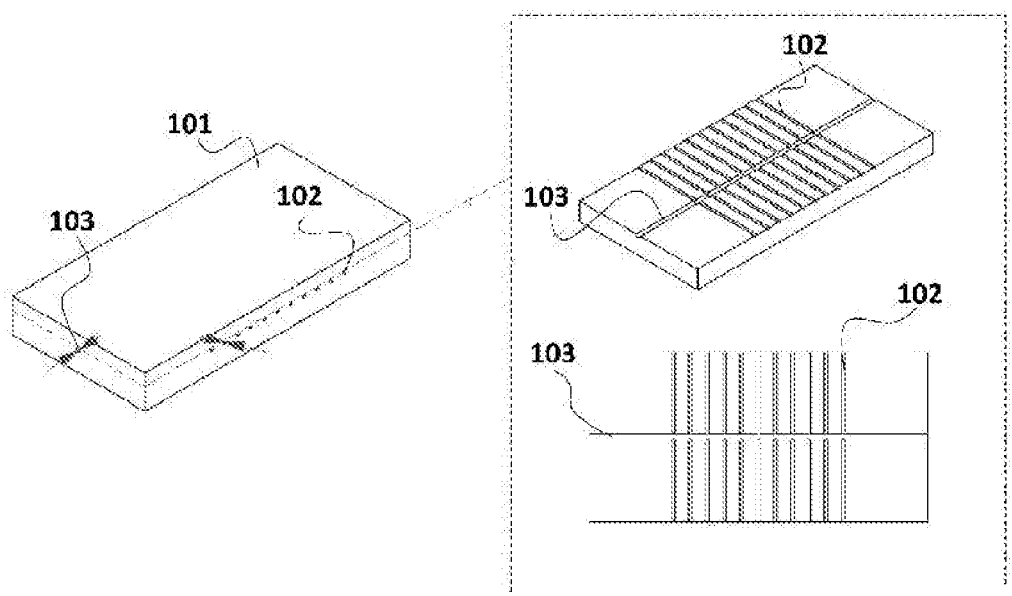
FIG. 2 shows the different cross sectional views of the present microfluidic energy harvester embodiment.
Figure 3:
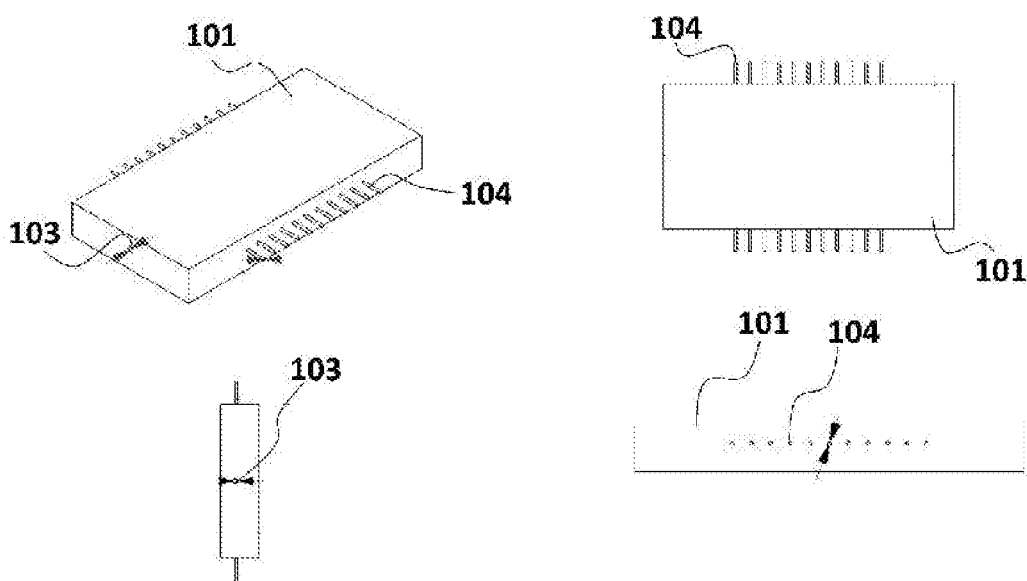
FIG. 3 shows different views of the present microfluidic energy harvester embodiment's constructional elements.
Figure 4:
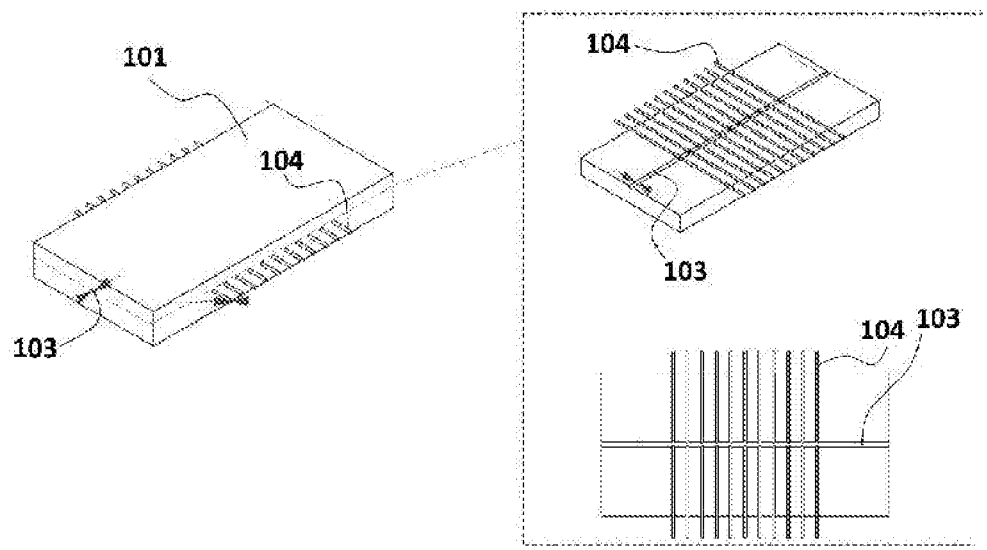
FIG. 4 shows different cross-sectional views of the present microfluidic energy harvester embodiment's constructional elements.

Reference next invited from the accompanying FIG. 3, which shows different views of the present microfluidic energy harvester embodiment's constructional elements. The microfluidic energy harvester's substrate with integrated electrodes is demonstrated in the FIG. 3 in which multiple metal/semiconducting metal-oxide electrodes 104 are inserted within the tributary microchannels 102 from the sides. The accompanying FIG. 4 shows the cross-sectional image of the microfluidic energy harvester's substrate with integrated electrodes as shown in the FIG. 3.

The electrodes 104 of the present microfluidic energy harvester preferably include a selective combination of metal and semiconducting metal-oxide electrodes having adequate band-gap to bind the solar energy under direct solar irradiation. In a preferred embodiment, the semiconducting metal-oxide electrodes include $Cu_2O$ electrode whereas, the metal electrodes include Cu electrodes.

The arrangement of the electrodes include disposition of the $Cu_2O$ electrodes inserted in the tributary microchannels 102 in one side of the main microchannel 103 and cooperative disposition of the Cu electrodes inserted in the tributary microchannels 102 in other side of the central microchannel 103 ensuring electrodes from both the sides do not touch each other and each of the electrodes touches flow of the electrolyte through the main microchannel 103. The arrangement is described in detail in the FIG. 4.

Figure 5:
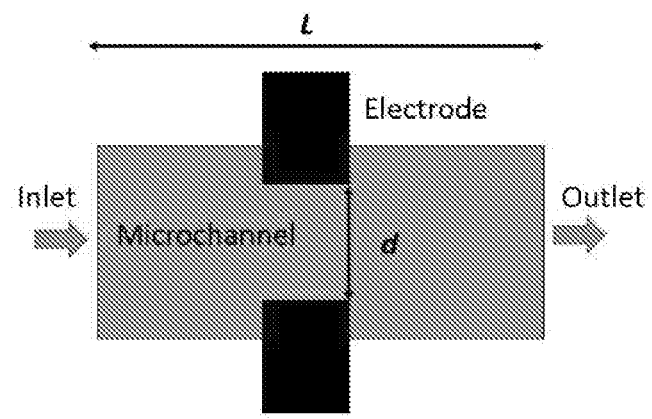
FIG. 5 shows block representation of the present microfluidic energy harvester embodiment.

Reference is next invited from the accompanying FIG. 5 which shows a block representation of the present microfluidic energy harvester where the electrolyte is flow through the central microchannel of effective diameter of d and length L. The electrodes are inserted from the sides of the channel. The streaming potential for such an energy harvester is $$U_{SP} = \frac{128\varepsilon_r\varepsilon_0\zeta L F_R}{\pi d^4 K_L}, \quad (1)$$

where, $K_L$ is specific electrical conductivity of the electrolyte, $F_R$ is the flow rate of the electrolyte, $\varepsilon_r$ is dielectric constant of water, $\varepsilon_0$ is dielectric permittivity of free space, and $\zeta$ is zeta-potential of the electrodes.

The electrochemical photovoltaic potential is calculated employing the expression, $$U_{ECPV} = \frac{nkT}{q}\ln\left(\frac{I_{Ph}}{I_D} + 1\right), \quad (2)$$

where n is ideality factor, k is Boltzmann constant, T is absolute temperature, q is charge of electron, $I_{ph}$ is current in presence of light and $I_D$ is the current in the dark.

The enhancement of potential due to SPR is evaluated from the expression $U_{SPR} = n_{abs} U_{ECPV}$ ... (3), where $n_{abs}$ is fraction of optical absorption increased due to SPR.

Combining all the aforementioned potentials as expressed in the Eqn. (1), (2) and (3), the total voltage which could be generated by the microfluidic energy harvester will be, $U_T^{th} = U_{ECPV} + U_{SP} + U_{SPR}$.

Fill-factor (FF) and power efficiency ( ) can also be evaluated for the present microfluidic energy harvester by employing the expressions, $$FF = \left(\frac{V_m \times J_m}{V_{OC} \times J_{SC}}\right) \times 100\% \text{ and}$$

$$\eta = \frac{P_{out}}{P_{in}} = \frac{V_{OC} \times I_{SC} \times FF}{P_{in}} = \frac{P_{Dout}}{P_{Din}},$$

where $V_{OC}$, $J_{OC}$, $V_m$, $J_m$, $P_{out}$, $P_{in}$, $P_{Dout}$, $P_{Din}$ denote open-circuit voltage, open-circuit current density, voltage corresponds to maximum power, current density corresponds to maximum power, output power, input power, output power density, and input power density, respectively.

In a preferred embodiment of the present invention, the metal nanoparticles of the electrolyte which preferably include Au nanoparticles (AuNPs) is synthesized by sodium borohydride ($NaBH_4$) reduction method of auric chloride ($HAuCl_4.3H_2O$) salt [refer to, Martin et al., Langmuir 2010, 26, 7410-7417]. Initially, a 50 mM aqueous solution of $AuCl^{4-}$ (solution I) is mixed with hydrochloric acid (HCl) in equal molar ratio. Following this, a 50 mM of $BH^{4-}$ solution (solution II) is prepared by dissolving $NaBH_4$ in aqueous 1 mM sodium hydroxide (NaOH) in equal molar ratio. Thereafter, 100 μl of solution I is mixed with water to obtain a solution where the concentration of gold ions is 0.5 mM. Then, 300 μl solution II is mixed with solution I with continuous stirring. The AuNPs formed as the change in color took place from yellow to orange and then to red. The AuNP suspensions are mixed with 4.0 M NaCl solution (v/v) at different proportion to prepare the electrolyte suspensions having different amount of nanoparticles.

Figure 6:
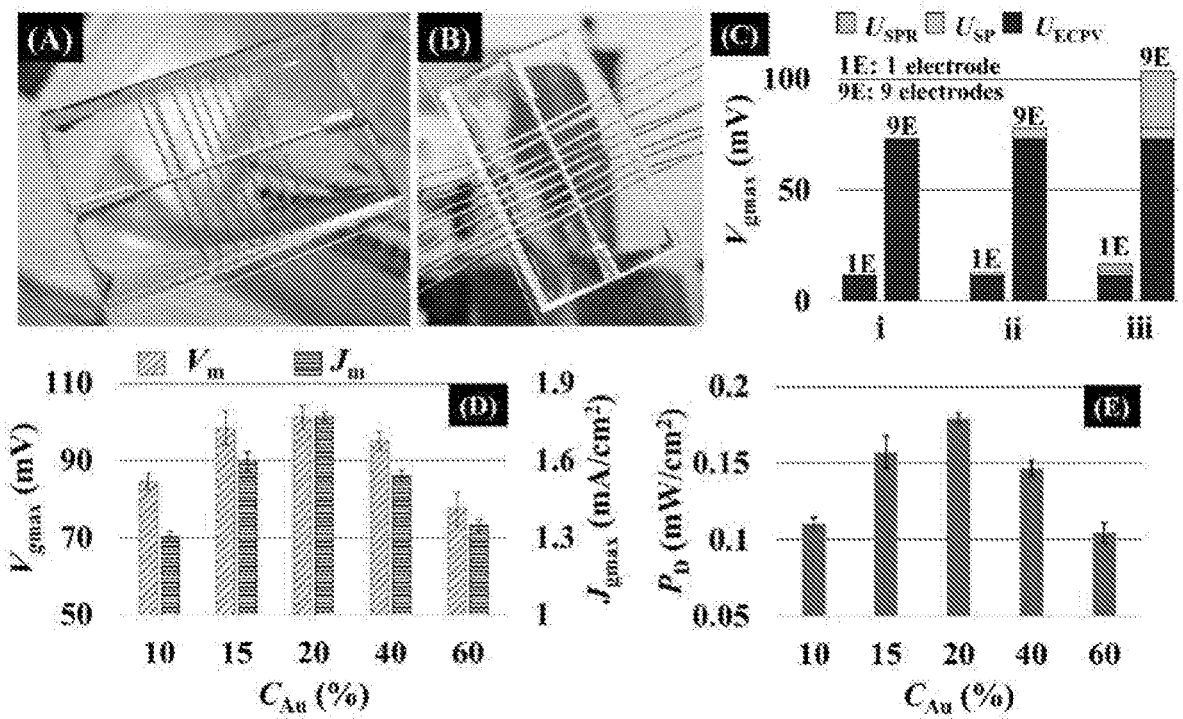
FIG. 6 show photographic illustration of the present microfluidic energy harvester (A) and (B); variation of voltage generation involving the present microfluidic energy harvester (C); variations in maximum generated voltage ($V_{gmax}$), current density ($J_{gmax}$) and power density ($P_D$) for different operating condition involving the present microfluidic energy harvester (D) and (E).

Reference is next invited from the accompanying FIG. 6(A)-(E), wherein the FIGS. 6(A) and 6(B) shows photographic illustration of the present microfluidic energy harvester and the FIG. 6(C)-6(E) shows the combined effect of electrochemical photovoltaics, streaming potential and surface plasmon resonance in the present microfluidic energy harvester in respect to convert solar energy into electrical energy.

The electrolyte used in the present microfluidic energy harvester is a 4.0 M NaCl (234 gm/L) aqueous solution with suspended Au nanoparticle which is pumped into the inlet of the central microchannel (103) with the help of hydrostatic head or micro-pumps. During the flow through the central microchannel, the electrolyte comes in contact with the semiconducting and metal electrodes (104) inside the microfluidic energy harvester and generates voltage under the exposure of the sunlight.

The combination of semiconductor (e.g. $Cu_2O$) electrodes, electrolyte (NaCl solution) and metal counter electrodes (e.g. Cu) within the microfluidic energy harvester constitute electrochemical photovoltaic (ECPV) units across the microfluidic energy harvester. These ECPV units generate electron-hole pairs or excitons under direct solar illumination in which electrons from valance band of the semiconductor electrodes jump to the conduction band, leaving a hole behind. The created electron is then transferred to the cations of the redox couples present in the electrolyte (e.g. Na+). Consequently, the holes reached the Cu counter electrode through the external circuit and oxidized the anions ($Cl^-$) of the redox couple in the electrolyte. Since there is no net consumption of material in the electrolyte due to this process, the ECPV units work under regenerative conditions.

The voltage generation inside the present microfluidic energy harvester can be categorized in three parts depending on their origins. The plots as shown in the FIG. 6(C) illustrates the voltage generation for a 9-pair electrodes based microfluidic energy harvester due to (i) only electrochemical photovoltaic effect where a stationary electrolyte which include 4.0M NaCl solution is exposed to the sunlight, (ii) electrochemical photovoltaic effect along with streaming potential for a flowrate of $F_R$=0.01 ml/min of the electrolyte which include 4.0M aqueous NaCl solution through the central microchannel under the exposure of the sunlight and (iii) combined effect of electrochemical photovoltaic effect, streaming potential, and surface plasmon resonance for a flowrate $F_R$=0.01 ml/min of the electrolyte which include a suspension of 4.0M aqueous NaCl solution and 20% (v/v) metallic nanoparticle (AuNP) concentration through the central microchannel.

From the plot (C), it would be apparent that there is a productive effect of flow and SPR in energy harvesting utilizing the sunlight. Further experiments are performed to measure the change in maximum generated voltage ($V_{gmax}$) and current density ($J_{gmax}$) with different concentration ($C_{Au}$) of AuNPs for the 9-pair electrodes system with a flow rate $F_R$=0.01 ml/min and effective light intensity of 1.1 kLux. The results of $V_{gmax}$ and $J_{gmax}$ were plotted in FIG. 6(D) while the FIG. 6(E) shows the change in power density ($P_D$) for this device with different concentration of AuNPs ($C_{Au}$). It is clear from plots under 6(D) and 6(E), that 20% (v/v) AuNPs is the optimum concentration for SPR to get the best performance, under the aforementioned conditions. After optimization of AuNP concentration, experiments are performed to optimize the flow rate ($F_R$) of the electrolyte. For this purpose, the maximum generated voltage ($V_{gmax}$), current density ($J_{gmax}$), and power density ($P_D$) are measured at different light intensities for different flow rates with and without AuNPs as shown in the accompanying FIGS. 7(A)-7(F).

The plots in FIGS. 7(A)-7(C) and 7(D)-7(F) show the maximum generated voltage ($V_{gmax}$), current density ($J_{gmax}$) and power density ($P_D$) of the present microfluidic energy harvester for different flow rates ($F_R$) of 4.0M NaCl solution at different intensities of the light without and with 20% (v/v) AuNPs, respectively. In the situations with and without AuNPs, the optimum flow rate is found to be $F_R$~0.025 ml/min.

The plots in FIGS. 7(A)-7(C) and 7(D)-7(F) clearly show that the generated voltage ($V_{gmax}$), current density ($J_{gmax}$) and power density ($P_D$) of the present microfluidic energy harvester are significantly enhanced due to the introduction of the AuNPs in the electrolyte solution. The figures also suggest that at higher flow rates of the electrolyte, the generated voltage is less because the partial destruction of electrical double layer (EDL) due to the flow near the electrodes. Moreover, mobility of electrons and holes should be too high to support the recombination of excitons. However, in case of higher flow rates the retention time of the redox species near the semiconductor surface abruptly decreases leading to a higher recombination in the system as the excitons do not get enough time to perform the redox reaction which in turn reduce the maximum generated voltage.

Reference is next invited from the accompanying FIGS. 8(A) and 8(B) which show comparison between theoretical and experimental studies and efficiencies of the present microfluidic energy harvester with different electrolyte viz. (I) stationary NaCl solution, (II) NaCl solution with flow, and (III) AuNPs in NaCl suspension flowing at optimized conditions (i.e. $F_R$=0.025 ml/min and $C_{Au}$=20% (v/v)), respectively.

For theoretical calculation of the streaming potential, it is assumed that width of the central microchannel (L) is 0.05 m, effective diameter of the central microchannel (d) is $10^{-4}$ m, the specific electrical conductivity ($K_L$) of the electrolyte is 0.015 S $m^{-1}$, the flow rate of the electrolyte ($F_R$) is $(4.17 \times 10^{-10})$ $m^3$ $s^{-1}$, dielectric constant of water ($\varepsilon E_r$) is 80, dielectric permittivity of free space ($\varepsilon_0$) is $8.854 \times 10^{-12}$ F $m^{-1}$, and the zeta-potential of the electrodes ($\zeta$) are 0.03 V. Plugging the values into the eqn. 1 the theoretical value for the $U_{SP}$ can be obtain equal to 12.04 mV. The experimental value of the $U_{SP}$=15 mV, is obtained by simply flowing the electrolyte inside the channel and then measuring the potential difference between the electrodes through a digital multi-meter.

Similarly, for theoretical calculation of the electrochemical photovoltaic potential, it is assumed that, the ideality factor (n) is 1, Boltzmann constant (k) is $1.38 \times 10^{-23}$ m² kg s⁻² K⁻¹, the absolute temperature (T) is 300 K, charge of electron (q) is $1.6 \times 10^{-9}$ C, the current in presence of light ($I_{ph}$) is 5.4 A, and the current in the dark ($I_D$) is 0.3 A. Plugging the values into the eqn 2, the theoretical value for the $U_{ECPV}$ can be obtained equal to 76.5 mV. The experimental value of the $U_{ECPV}$=73 mV, is obtained by illuminating the stationary salt-water electrolyte and then measuring the potential difference between the electrodes through a digital multi-meter.

The theoretical value of the SPR potential is obtained as $U_{SPR}$=30.6 mV. In order to check the effect of SPR, an absorption spectroscopy is performed keeping the volume of the AuNPs constant, which provided the amount of absorption in the electrolyte suspension with different AuNP loading. The average absorption is calculated for a full spectral range and is found to be about 40% when the AuNP loading in the electrolyte is about 20% (v/v). The experimental value of the $U_{SPR}$=27 mV, is obtained by illuminating the stationary AuNP loaded salt-water electrolyte, then measuring the potential difference between the electrodes through a digital multi-meter, and thereafter subtracting the experimental value of the $U_{ECPV}$ from the multi-meter reading.

Combining all the aforementioned theoretical potentials, the total theoretical value of the voltage, which could be generated by the MEH as, $U_T^{th}=U_{ECPV}+U_{SP}+U_{SPR}$=119.1 mV. Combining all the aforementioned experimental potentials, the total experimental value of the voltage, which could be generated by the MEH as, $U_T^{Ex}=U_{ECPV}+U_{SP}+U_{SPR}$=115 mV. The FIG. 8(A) shows a typical comparison between theoretical values evaluated and experimental values measured for the reported MEH.

The fill-factor (FF) and power efficiency ( ) are also evaluated for the MEH employing the expressions, $$FF = \left(\frac{V_m \times J_m}{V_{OC} \times J_{SC}}\right) \times 100\% \text{ and}$$

$$\eta = \frac{P_{out}}{P_{in}} = \frac{V_{OC} \times I_{SC} \times FF}{P_{in}} = \frac{P_{Dout}}{P_{Din}},$$

where $V_{OC}$, $J_{OC}$, $V_m$, $J_m$, $P_{out}$, $P_{in}$, $P_{Dout}$, $P_{Din}$ denote open-circuit voltage, open-circuit current density, voltage corresponds to maximum power, current density corresponds to maximum power, output power, input power, output power density, and input power density, respectively. The $P_{Din}$ is measured using a lux meter where 1 lux is 1 lumen/m². The luminous efficacy of a 100 W incandescent bulb is ~15 lumen/W, which is used to calculate the optical flux ~0.067 W/m². The light source is placed at a distance of 35 cm, which led to an intensity of ~1100 lux=73.7 W/m². Thus, the input power density is $P_{Din}$=73.7 W/m². The output power density, $P_{Dout}$ $V_m \times J_m$ where, $V_m$ and $J_m$ is the voltage and current density corresponds to maximum power which can be achieved from the J-V curve. FIG. 8(C) shows the typical variations in the power efficiency ( ) for the MEH (I) salt-water electrolyte is stationary, (II) when the salt-water electrolyte is flown at an optimum flow rate, and (III) when the salt-water electrolyte with suspended AuNPs (20% v/v) is flown at an optimum flow rate.

The following Table 1 shows the typical theoretical and experimental values evaluated during these calculations for the MEHs (I)-(III).

TABLE I

| System | $V_{oc}$ (mV) | $J_{SC}$ (mA/cm2) | $V_m$ (mV) | $J_m$ (mA/cm2) | FF % | η % |
|---|---|---|---|---|---|---|
| I. Stationary Salt-water Electrolyte | 68.6 | 0.91 | 42.4 | 0.6 | 41.06 | ~0.35 |
| II. Flowing Salt-water Electrolyte | 79.4 | 1.17 | 48 | 0.86 | 44.29 | ~0.56 |
| III. Flowing Electrolyte with AuNPs | 106.3 | 1.78 | 83.7 | 1.49 | 65.91 | ~1.71 |

Reference is now invited from the accompanying FIGS. 9 and 10 which show the typical characterizations of the AuNPs and Cu—Cu₂O electrodes. The FIGS. 9(A) and 9(B) show the TEM image and SAED pattern of the synthesized AuNPs and FIG. 9(C) shows the EDX of AuNPs. The FIG. 9(D) shows the FESEM image of grown Cu₂O film.

The cross-sectional FESEM image [FIG. 9(E)] of the electrode shows the thickness of the Cu₂O layer and FIG. 9 (F) shows the EDX of the Cu₂O film. The TEM images in the FIGS. 10(A)-10(C) show the AuNP in 4M NaCl at the proportions of, 1:4 (v/v), 1:1 (v/v), and 4:1 (v/v), respectively.

We claim:
1. A microfluidic energy harvester for converting solar energy into electrical energy comprising
    a polymer substrate having an embedded central microchannel with an inlet and an outlet;
    an electrolyte in said central microchannel;
    an electrode assembly having at least one pair of electrodes arranged in series in said polymer substrate and perpendicular to said central microchannel on both sides of the central microchannel, ensuring direct contact between said at least one pair of electrodes and said electrolyte in said central microchannel for ensuing electrochemical photovoltaic effect to convert the solar energy into the electrical energy under solar illumination;
    wherein the electrolyte is configured to flow in the central microchannel through the inlet by using hydrostatic head or micro-pump at a constant flow rate enabling conversion of mechanical energy of the electrolyte flow into streaming potential across the at least one pair of electrodes; and
    wherein the electrolyte includes a suspension of aqueous 4.0M NaCl solution with 20 vol. % metallic Au (gold) nanoparticle concentration capable of producing surface plasmon resonance (SPR) under direct solar illumination when the electrolyte flow through the central microchannel which enhance potential difference across the at least one pair of electrodes and generates the potential difference equivalent to combined influences from the solar energy, the streaming potential and the surface plasmon resonance resulting amplification of the electrical energy generation.
2. The microfluidic energy harvester for converting solar energy into electrical energy as claimed in claim 1, wherein the at least one pair of electrodes includes a conducting metal electrode and a semiconducting metal-oxide electrode having bandgap to bind the solar energy under direct solar illumination.

3. The microfluidic energy harvester for converting solar energy into electrical energy as claimed in claim 2, wherein the polymer substrate includes a transparent slab of polydimethylsiloxane embedding the central microchannel with the inlet and the outlet;

wherein said polymer substrate includes a plurality of tributary microchannels arranged in series and perpendicular to the central microchannel on both sides of the central microchannel, wherein each of the tributary microchannels is connected to the central microchannel and includes provision for inserting the conducting metal electrode and the semiconducting metal-oxide electrode enabling the metal and the semiconducting metal-oxide electrodes to be in contact with the electrolyte residing and/or flowing in the central microchannel without the metal and the semiconducting metal-oxide electrodes touching each other.

4. The microfluidic energy harvester for converting solar energy into electrical energy as claimed in claim 3, wherein the semiconducting metal-oxide electrodes include $Cu_2O$ electrodes inserted in the tributary microchannels in one side of the main microchannel and the conducting metal electrodes include Cu electrodes inserted in the tributary microchannels in other side of the central microchannel ensuring the electrodes from both the sides do not touch each other but touch the electrolyte residing or flowing in the central microchannel.

5. The microfluidic energy harvester for converting solar energy into electrical energy as claimed in claim 1, wherein the electrochemical photovoltaic effect generated electrochemical photovoltaic potential is $$U_{ECPV} = \frac{nkT}{q} \ln\left(\frac{I_{Ph}}{I_D} + 1\right),$$

where n is ideality factor, k is Boltzmann constant, T is absolute temperature, q is charge of electron, $I_{ph}$ is current in presence of light and $I_D$ is the current in the dark.

6. The microfluidic energy harvester for converting solar energy into electrical energy as claimed in claim 1, wherein the streaming potential generated due to the electrolyte flow is $$U_{SP} = \frac{128\varepsilon_r\varepsilon_0\zeta LF_R}{\pi d^4 K_L},$$

where, d is effective diameter of the central microchannel, L is length of the central microchannel, $K_L$ is specific electrical conductivity of the electrolyte, $F_R$ is flow rate of the electrolyte, $\varepsilon_r$ is dielectric constant of water, $\varepsilon_0$ is dielectric permittivity of free space, and $\zeta$ is zeta-potential of the electrodes.

7. The microfluidic energy harvester for converting solar energy into electrical energy as claimed in claim 1, wherein the enhancement of potential due to the SPR is $U_{SPR}=n_{abs}U_{ECPV}$, where $n_{abs}$ is fraction of optical absorption increased due to the SPR.

8. The microfluidic energy harvester for converting solar energy into electrical energy as claimed in claim 3, wherein the conversion of the solar energy into the electrical energy due to the electrochemical photovoltaic effect under direct solar illumination by working under regenerative conditions includes generation of electron-hole pairs or excitons under direct solar illumination wherein electrons from valance band of the semiconductor electrodes jumped to conduction band, leaving a hole behind;

transferring of the electron from valence band to cations of redox couples present in the electrolyte;

simultaneous transferring of the hole of the electron-hole pairs to the metal electrode through external circuit and oxidizing anions of the redox couple in the electrolyte.

* * * * *